(12) United States Patent
Zinser

(10) Patent No.: US 10,727,014 B2
(45) Date of Patent: Jul. 28, 2020

(54) SAFETY CIRCUIT FOR FAIL-SAFE SHUTDOWN OF A DANGEROUS SYSTEM

(71) Applicant: Pilz GmbH & Co. KG, Ostfildern (DE)

(72) Inventor: Christoph Zinser, Ostfildern (DE)

(73) Assignee: Pilz GmbH & Co. KG, Ostfildern (DE)

( * ) Notice: Subject to any disclaimer, the term of this patent is extended or adjusted under 35 U.S.C. 154(b) by 261 days.

(21) Appl. No.: 15/711,513

(22) Filed: Sep. 21, 2017

(65) Prior Publication Data
US 2018/0082813 A1 Mar. 22, 2018

(30) Foreign Application Priority Data

Sep. 21, 2016 (DE) .................. 10 2016 117 821

(51) Int. Cl.
*H01H 47/04* (2006.01)
*H01H 47/00* (2006.01)
(Continued)

(52) U.S. Cl.
CPC ............ *H01H 47/004* (2013.01); *G05B 9/02* (2013.01); *G05B 9/03* (2013.01); *H01H 47/005* (2013.01); *H02H 9/045* (2013.01)

(58) Field of Classification Search
CPC . G05B 9/00; G05B 9/02; G05B 19/02; G05B 23/0291; H02H 3/10; H02H 3/18; H02H 3/02; H01H 47/004; H01H 47/005
(Continued)

(56) References Cited

U.S. PATENT DOCUMENTS

2002/0093951 A1* 7/2002 Rupp .................. G05B 9/03 370/362
2011/0098829 A1* 4/2011 Weddingfeld ....... G05B 19/052 700/2
(Continued)

FOREIGN PATENT DOCUMENTS

DE 10011211 A1 9/2001
DE 10216226 A1 10/2003
(Continued)

OTHER PUBLICATIONS

Search Report in corresponding European Patent Application No. 17188164.2, completed on Jan. 18, 2018, with English translation.

*Primary Examiner* — Tuan T Dinh
(74) *Attorney, Agent, or Firm* — Edell, Shapiro & Finnan, LLC.

(57) ABSTRACT

A safety circuit for fail-safe shutdown of a dangerous technical system with a plurality of disconnectable system component groups comprises a plurality of safety switching devices electrically connected to one another in series to form a closed-loop monitoring circuit in which electric monitoring current flows through the safety switching devices. Each of the safety switching devices includes: a fail-safe control unit that detects and evaluates information about a current operating state of any system component group assigned to it; and a current flow adjuster that changes the current flow within the monitoring circuit to interrupt the monitoring circuit in response to detection of a safety command by the safety switching device. The fail-safe control units generate a shutdown signal in response to an interruption of the current flow within the monitoring circuit, which causes the fail-safe shutdown of any of the system component group not already shut down.

9 Claims, 5 Drawing Sheets

(51) Int. Cl.
*G05B 9/02* (2006.01)
*G05B 9/03* (2006.01)
*H02H 9/04* (2006.01)

(58) Field of Classification Search
USPC ...... 361/83–84, 89, 91.7, 100–118; 307/117, 307/326; 323/284
See application file for complete search history.

(56) References Cited

U.S. PATENT DOCUMENTS

| | | | | |
|---|---|---|---|---|
| 2012/0268107 | A1* | 10/2012 | Laturner | G05B 9/02 |
| | | | | 324/161 |
| 2014/0100675 | A1* | 4/2014 | Dold | G05B 19/0428 |
| | | | | 700/79 |
| 2014/0168837 | A1* | 6/2014 | Henneberger | H02H 3/10 |
| | | | | 361/84 |

FOREIGN PATENT DOCUMENTS

| | | | |
|---|---|---|---|
| EP | 1102378 | A2 | 5/2001 |
| EP | 2098925 | A1 | 9/2009 |
| EP | 2720094 | A1 | 4/2014 |
| EP | 2720414 | A1 | 4/2014 |

\* cited by examiner

SAFETY CIRCUIT FOR FAIL-SAFE SHUTDOWN OF A DANGEROUS SYSTEM

CROSS REFERENCE TO RELATED APPLICATIONS

This application claims foreign priority under 35 U.S.C. § 119(a)-(d) to Application No. DE 102016117821.7 filed on Sep. 21, 2017, the entire contents of which are hereby incorporated by reference.

BACKGROUND

In modern technical systems, for example industrial production systems and assembly lines, transport and conveying systems, operating cycles are increasingly controlled by automation. These types of systems have a central operation controller, which receives setpoint and process values from the system and, based on these, uses a control program implemented in the operation controller to generate corresponding control signals by which the actuators of the system may be actuated.

In addition to the control of the actual operating cycle of the technical system, safety aspects also play an important role. In this context, it concerns preventing hazards which arise from the individual system component groups from affecting humans who are in the vicinity of these system component groups. For example, system component groups, which may execute automated movements, are protected by suitable protective barriers, light barriers, tread mats, and the like. Furthermore, to protect people, protective doors, protective flaps, and the like may be used, which comprise an actuator/sensor combination, by which an opening process may be reliably detected so that the entire system or at least one dangerous system component of the system may be shutdown or transitioned into a state that is not hazardous for humans. In addition, it is also known to equip technical systems with emergency off or emergency stop buttons/switches, due to the actuation of which, the entire system, or at least one of the dangerous system components of the system, may be shut down, or transitioned in another way into a state that is not hazardous for humans. For this purpose, corresponding safety circuits are used in the prior art, as they are known, for example, from EP 1 363 306 A2 or DE 10 2004 020 995 A1.

In assembly lines, it is often necessary that multiple safety switching devices, which monitor individual dangerous system component groups and initiate, in the event of danger, a reliable shutdown process of the relevant system component group or transition this system component group into an operating state that is not hazardous to humans, are connected to one another. One objective during the design layout of the individual safety switch devices consists in that all system component groups connected thereto simultaneously shut down when an emergency off or emergency stop button/switch is actuated at one of the system component groups. Faults in the connecting wiring of the safety switching devices among themselves, or in the safety switching devices themselves, are thereby not permitted to lead to a loss of these safety functions or to a dangerous operating state of the entire system or to individual system component groups.

In the prior art, the individual safety switching devices were, for example, connected to one another via a secure data bus or by conventional wiring of multichannel inputs and outputs of the safety switching devices to one another. This is linked to relatively high effort and subsequently also to high costs.

In safety switching devices, which are operated by the applicant under the designation "PNOZ®elog", a star-shaped cascading is provided by a pulse signal to an information transmission line. Information, in particular a reliable shutdown message, may thereby be transmitted by a transmitter via the information transmission line in only one specific information flow direction. In other words, this means that the information is transmitted from a transmitter in a specific information flow direction and is received by one or more receivers.

SUMMARY

It is the object of the present invention to provide a safety circuit of the type listed at the outset, which facilitates, in a particularly simple way, a reliable shutdown of a dangerous system or a secure transition of a dangerous system into a state that is not hazardous to humans if there is a safety command present in a system component group, in particular if an emergency off or an emergency stop button/switch is actuated.

The solution to this problem is provided by a safety circuit for fail-safe shutdown of a dangerous system with a number ≥2 of disconnectable system component groups, comprising a plurality of safety switching devices which are in communication connection with one another and each has a fail-safe control unit, wherein at least one of the system component groups is assigned to each of the fail-safe control units, and wherein each of the fail-safe control units is configured to detect and to evaluate information about a present operating state of the at least one system component group assigned to the same.

The safety switching devices for forming the communication connection are electrically switched in series and form a monitoring circuit so that in a closed loop monitoring circuit, an electric monitoring current may flow through the safety switching devices, wherein each of the safety switching devices comprises at least one current flow adjuster which is configured to change the current flow within the monitoring circuit, in particular to interrupt the monitoring circuit, if a safety command, in particular an emergency off or emergency stop message, is detected by the relevant safety switching device, and wherein each of the fail-safe control units is configured, in the case of a change, in particular an interruption, of the current flow within the monitoring circuit, to generate a shutoff signal, which may cause the fail-safe shutdown of the system component groups which are connected to the respective fail-safe control unit and are not already shut down.

The invention arises from the underlying concept that reliable information, for example, reliable activation and shutdown messages, may be transmitted by a reliable electrical connection between multiple safety switching devices, which are configured in the form of an electrical series circuit. All safety switching devices may thereby equally transmit and receive the reliable information via the monitoring circuit. An information flow is thus carried out in not only one established information flow direction. In an activated state of the safety circuit and without the presence of a safety command, in particular, an emergency off or emergency stop message, a defined monitoring current flows through the monitoring circuit. If one of the safety switching devices of the system component group connected thereto, for example, a machine or a robot, receives a safety command, in particular an emergency off or emergency stop message, and is to transmit this message to all remaining safety switching devices, then the current flow within the monitoring circuit is changed by the current flow adjuster of the relevant safety switching device. By changing the current flow within the monitoring circuit, the fail-safe control units of the remaining safety switching devices may each generate a shutdown signal, by which the system component groups of the dangerous system connected thereto may be safely shut down. The safety circuit according to the invention has the advantage that it enables a reliable and equal, in particular also bidirectional, communication, without an expensive wiring of the individual safety switching devices, so that the activation and shutdown messages may be reliably transmitted. The safety switching devices of the safety circuit are preferably designed such that they comply with the requirements for classification in Category 4 (Performance Level e) of the European standard EN ISO 13849-1-2009.

The current flow adjuster may preferably be designed as switching devices, which are configured to selectively close or to interrupt the monitoring circuit.

In one advantageous embodiment, it is proposed that each of the safety switching devices has a measuring device, which is connected to the fail-safe control unit and is configured to monitor the electric current flow within the monitoring circuit, and to provide a first input signal to the fail-safe control unit of the relevant safety switching device in the case of a closed monitoring circuit, and to provide a second input signal in the case of a change, in particular, an interruption, of the current flow within the monitoring circuit. The change of the current flow within the monitoring circuit may be carried out by measuring an electrical variable, in particular by measuring a current change, or by measuring a voltage change. The input signals, which are provided to the fail-safe control units, may preferably likewise be binary input signals.

Preferably, at least one safety switching element may be connected to each of the fail-safe control units, said safety switching element is in turn connected to at least one of the system component groups and is configured to shut down the system component group upon receiving the shutdown signal from the fail-safe control unit. The safety switching elements may, for example, be designed as safety relays.

In one particularly advantageous embodiment, the fail-safe control units may be configured such that they may each generate an activation signal upon receiving the first input signal, which causes a closing of the safety switching element connected to the respective fail-safe control unit, and may each generate the shutdown signal upon receiving the second input signal, which causes an opening of the safety switching element connected to the respective fail-safe control unit. The activation signal and the shutdown signal, which form output signals of the fail-safe control unit, may preferably be machine-readable binary signals.

In one useful embodiment, it may be provided that each of the measuring devices comprises at least one resistor and one evaluation unit connected thereto, the evaluation unit being designed such that it may determine an electrical voltage drop across the at least one resistor and, depending on the size of the voltage drop, may generate the first or second input signal. A voltage drop may be metrologically determined very easily and facilitates not only the detection of whether the monitoring circuit has been interrupted by one of the safety switching devices, but also the detection of line breaks, short circuits, or external electrical voltages.

The current flow adjuster may preferably be designed as transistors, in particular as field effect transistors, or as relays. Thus, a technically robust and operationally reliable configuration of the current flow adjuster is created.

To achieve a defined current flow within the monitoring circuit, it is proposed in one preferred embodiment that a first safety switching device of the safety circuit has a continuous current source which is designed to generate a continuous current. This thus achieves that a defined monitoring current flows through the monitoring circuit and potential current fluctuations, which might be viewed as faults by the safety circuit under certain circumstances, may be avoided.

In one alternative embodiment, it may also be provided that the first safety switching device of the safety circuit has a continuous voltage source which is designed to provide a continuous voltage. Thus, effects, which result from fluctuations in the electrical supply voltage and may likewise be interpreted as faults, are advantageously prevented.

In one advantageous refinement, the possibility exists that each of the safety circuits has at least one memory which is connected to the evaluation unit of the measuring device of the relevant safety switching device, wherein a first reference voltage value $U_{ref,1}$ of a reference voltage upstream of the resistor and a second reference voltage value $U_{ref,2}$ of a second reference voltage downstream of the electrical resistor are retrievably stored in the memory. The two reference voltage values $U_{ref,1}$ and $U_{ref,2}$ of all safety switching devices may be initialized ("learned") during commissioning of the safety circuit and are respectively retrievably stored in the memory of the safety switching devices. If deviations from the retrievably stored reference voltage values $U_{ref,1}$ and $U_{ref,2}$ occur in the actual voltages in the safety switching devices upstream or downstream of the resistor of the respective measuring device, then the evaluation units of the measuring devices may generate corresponding input signals, which are provided to the fail-safe control unit of the relevant safety switching device. The fail-safe control unit of each safety switching device generates a shutdown signal which causes a shutdown of the system component group connected thereto, in particular an opening of the safety switching element connected to the fail-safe control unit and to the system component group.

To further simplify the detection of faults in the safety circuit, it is proposed in one particularly advantageous embodiment that the first safety switching device of the safety circuit has a voltage pulse generator, which is connected to the continuous voltage source and is configured to generate defined voltage pulses, in particular 0 V voltage pulses, and that each of the safety switching devices comprises a voltage pulse evaluator configured to detect and to evaluate the voltage pulses. In other words, the voltage is modulated in a defined way. If no voltage pulses, which may be in particular 0 V voltage pulses, or voltage pulses that are not the expected ("learned") voltage pulses, are detected by one voltage pulse evaluator of at least one of the safety switching devices, then a fault is likewise present, so that the safety switching devices may initiate a reliable shutdown process of the system component groups of the dangerous system.

To further increase the operational safety of the safety circuit, it may be provided in one advantageous refinement that each of the safety switching devices comprises a plurality of current flow adjusters switched in series. The current flow adjusters which may preferably be designed, for example, as transistors, in particular as field effect transistors, or as relays, may be tested during activation of the safety circuit. To synchronize these tests, an addressing of the safety switching devices, which may be automatically carried out or may be initiated by a first safety switching device, is advantageous.

BRIEF DESCRIPTION OF THE DRAWINGS

Other features and benefits of the present invention become clear based on the subsequent description of preferred embodiments with reference to the included figures. As shown in.

DETAILED DESCRIPTION

Figure 1:
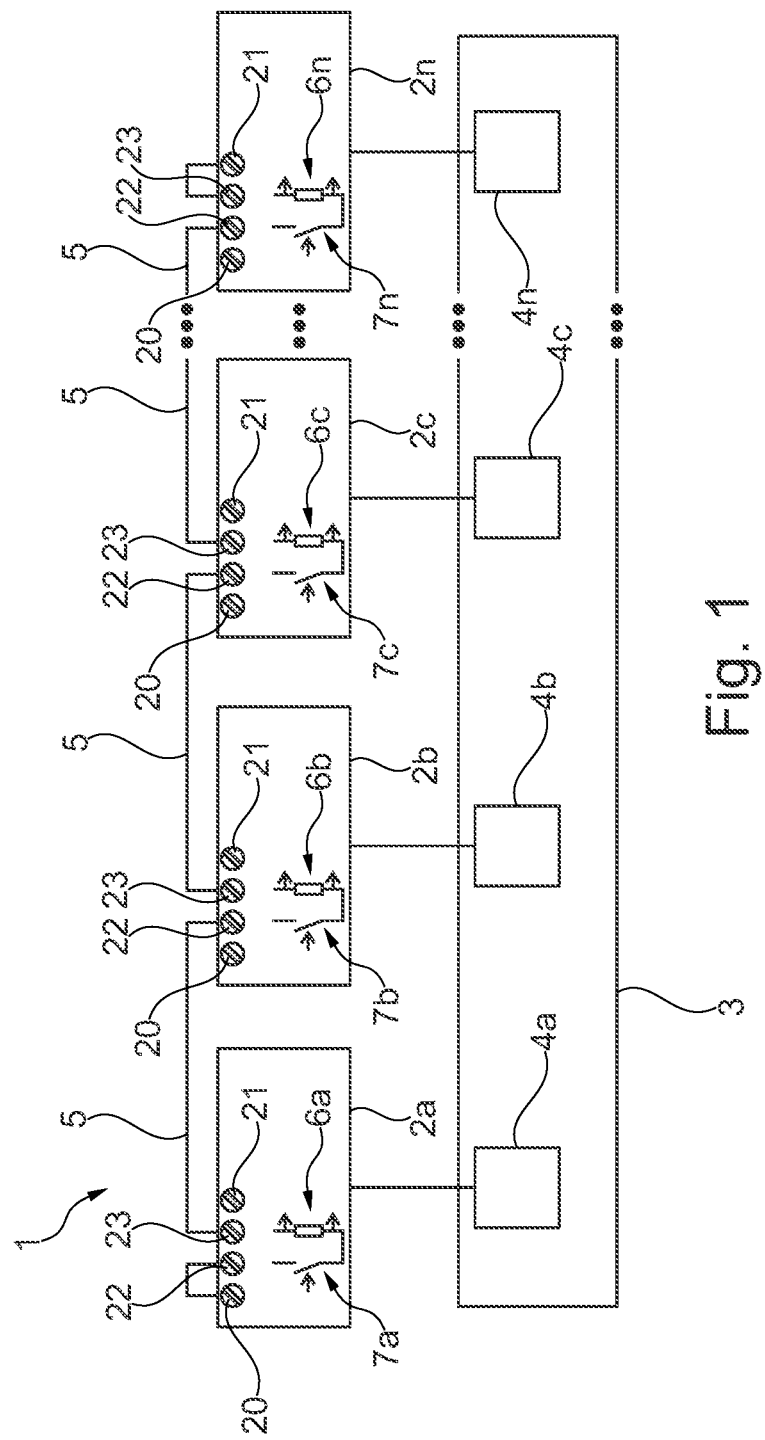
FIG. 1 a highly simplified schematic depiction, which illustrates the basic principle of a safety circuit which is carried out according to the present invention, FIG. 2 a simplified schematic depiction of a safety circuit, which is carried out according to a first embodiment of the present invention, FIG. 3 a simplified schematic depiction of a safety circuit, which is carried out according to a second embodiment of the present invention, FIG. 4 a simplified schematic depiction of a safety circuit, which is carried out according to a third embodiment of the present invention, FIG. 5 a simplified schematic depiction of a safety circuit, which is carried out according to a fourth embodiment of the present invention.

With reference to FIG. 1, a safety circuit 1, which is designed for fail-safe shutdown of a dangerous system 3 comprising a number n ≥2 of disconnectable system component groups $4a, \ldots, 4n$, in particular machines or robots, comprises a plurality of safety switching devices $2a, \ldots, 2n$. These safety switching devices $2a, \ldots, 2n$ are preferably designed such that they comply with the requirements for classification in Category 4 (Performance Level e) of the European standard EN ISO 13849-1-2009. The number of safety switching devices $2a, \ldots, 2n$ preferably corresponds to the number of system component groups $4a, \ldots, 4n$ of dangerous system 3, so that each of system component groups $4a, \ldots, 4n$ is respectively assigned to one of safety switching devices $2a, \ldots, 2n$. Individual safety switching devices $2a, \ldots, 2n$ are electrically connected to one another in series with the aid of electrical connecting lines 5. Safety circuit 1 preferably has a modular and scalable structure so that the number n of safety switching devices $2a, \ldots, 2n$ may be changed in a simple way, even retroactively. Due to the modular structure of safety circuit 1, each of safety switching devices $2a, \ldots, 2n$ has a voltage terminal 20 for supplying a supply voltage, a ground terminal 21, an input terminal 22, and an output terminal 23.

Voltage terminal 20 of first safety switching device 2a is connected to an external voltage supply device, which may supply a supply voltage, which may lie, in particular, between 20 VDC and 30 VDC, to safety circuit 1. Voltage terminal 20 of first safety switching device 2a is connected to input terminal 22 of first safety switching device 2a. Output terminal 23 of first safety switching device 2a is connected to input terminal 22 of second safety switching device 2b. Output terminal 23 of second safety switching device 2b is connected to input terminal 22 of third safety switching device 2c, and so on. Output terminal 23 of nth safety switching device 2n is connected to ground terminal 21 of nth safety switching device 2n. In this way, an electric monitoring circuit of safety circuit 1 is formed, which is closed by a common ground line of the external voltage supply device, not explicitly depicted here, and of the last (nth) safety switching device 2n.

Each of safety switching devices $2a, \ldots, 2n$ additionally comprises a measuring device $6a, \ldots, 6n$, by which an electric variable, for example an electric voltage or an electric current, may be measured, and current flow adjusters $7a, \ldots, 7n$. Current flow adjusters $7a, \ldots, 7n$ are designed in this and all other embodiments depicted here as switching devices which may be selectively opened and closed. In a closed state of these current flow adjusters $7a, \ldots, 7n$, a defined monitoring current flows through the monitoring circuit. If one of current flow adjusters $7a, \ldots, 7n$ is opened, then the monitoring circuit is opened so that a current flow is no longer present within the monitoring circuit.

Each safety switching device $2a, \ldots, 2n$ of safety circuit 1 is configured to transmit a safety command, in particular an emergency off or emergency stop message, from system component groups $4a, \ldots, 4n$ disconnectably connected to the relevant safety switching device $2a, \ldots, 2n$ to the remaining safety switching devices $2a, \ldots, 2n$ of safety circuit 1, or to receive a safety command, in particular an emergency off or emergency stop message from one of the remaining safety switching devices $2a, \ldots, 2n$. As shall be explained below in greater detail, in the normal operating state of safety circuit 1, all current flow adjusters $7a, \ldots, 7n$ are closed so that the presence of an electric monitoring current, which flows through safety switching devices $2a, \ldots, 2n$ connected in series, may be detected by measuring the electric variable by integrated measuring device $6a, \ldots, 6n$ of each safety switching device $2a, \ldots, 2n$.

In order to forward a safety command, in particular an emergency off or emergency stop message, which one of safety switching devices $2a, \ldots, 2n$ has received, to the remaining safety switching devices $2a, \ldots, 2n$ of safety circuit 1, current flow adjusters $7a, \ldots, 7n$ of the relevant safety switching device $2a, \ldots, 2n$ are opened. This interruption of the electric monitoring current flow within the monitoring circuit of safety circuit 1 may be detected by measuring devices $6a, \ldots, 6n$ of the remaining safety switching devices $2a, \ldots, 2n$, so that these may likewise initiate, in the way described below, a safety command, in particular an emergency off or emergency stop function, in system component groups $4a, \ldots, 4n$ connected to the relevant safety switching devices $2a, \ldots, 2n$.

With reference to FIGS. 2 through 5, this basic operating concept of safety circuit 1, previously explained briefly, will be explained in greater detail by way of four embodiments. To keep the subsequent depiction clear, safety circuits 1 depicted in FIGS. 2 through 5 each have three safety switching devices 2a, 2b, 2c, which are electrically connected to one another in series in the previously described way. One of system component groups 4a, 4b, 4c is connected to each of these safety switching devices 2a, 2b, 2c.

Figure 2:
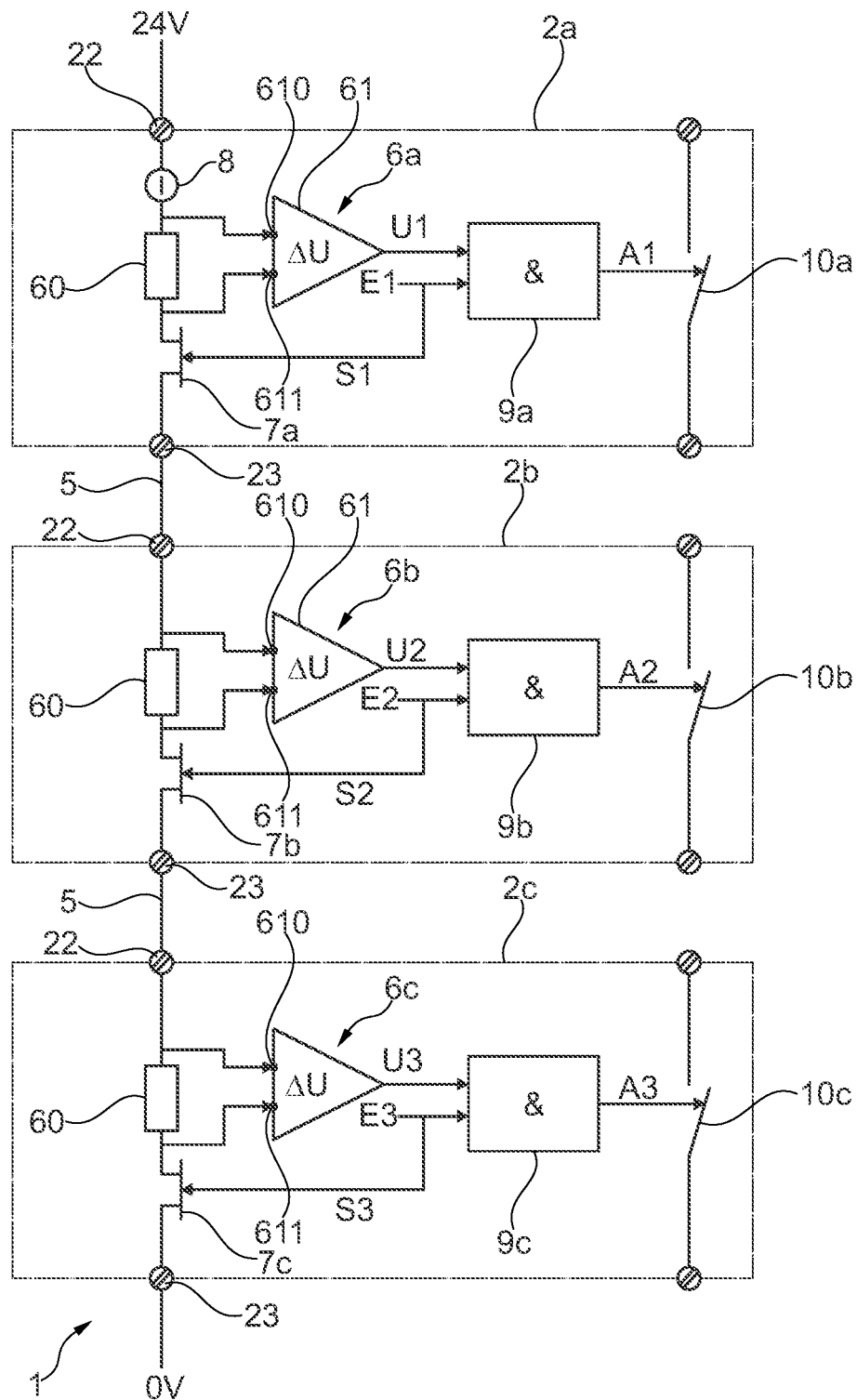

With reference to FIG. 2, first safety switching device 2a has, in this embodiment, a continuous current source 8, which is connected to input terminal 22 of first safety switching device 2a, and at which the supply voltage of safety circuit 1, which is preferably 24 V, is applied. Measuring devices 6a, 6b, 6c of safety switching devices 2a, 2b, 2c each comprise an electrical resistor 60 and an evaluation unit 61, which is preferably designed as a microcontroller with a first A/D input 610 and a second A/D input 611. During operation of safety circuit 1, a voltage drop ΔU may be detected across electrical resistor 60 by first A/D input 610 and second A/D input 611 of evaluation unit 61 of one of those measuring devices 6a, 6b, 6c, and evaluated by evaluation unit 61.

Current flow adjusters 7a, 7b, 7c are each designed, in this embodiment and also in the remaining embodiments which are described below, as field effect transistors (FET). Alternatively, current flow adjusters 7a, 7b, 7c may also be implemented as conventional transistors or as relays.

Each of safety switching devices 2a, 2b, 2c additionally has a fail-safe control unit 9a, 9b, 9c, which is connected on the input side to evaluation unit 61 of measuring device 6a, 6b, 6c of relevant safety switching device 2a, 2b, 2c and forms an AND gate. As will be explained in greater detail below, evaluation units 61 are configured to transmit a binary input signal (U1, U2, U3=0 or U1, U2, U3=1) to respective fail-safe control unit 9a, 9b, 9c.

Fail-safe control unit 9a, 9b, 9c of each safety switching device 2a, 2b, 2c additionally has one or more inputs. Input signals from one or more sensors may be provided to relevant fail-safe control unit 9a, 9b, 9c via these inputs and said input signals may be evaluated by fail-safe control units 9a, 9b, 9c. It is thus possible that fail-safe control unit 9a, 9b, 9c of each of safety switching devices 2a, 2b, 2c may receive information about the operating state of system component groups 4a, 4b, 4c connected thereto, and/or a safety command, in particular an emergency off or emergency stop message. The results of the internal input signal processing likewise form a binary input signal (E1, E2, E3=0 or E1, E2, E3=1) for the AND gate of fail-safe control unit 9a, 9b, 9c.

In addition, each of safety switching devices 2a, 2b, 2c respectively has, in the embodiments shown here, one safety switching element 10a, 10b, 10c, which is connected on the output side to fail-safe control unit 9a, 9b, 9c of relevant safety switching device 2a, 2b, 2c. Each of these safety switching elements 10a, 10b, 10c is respectively connected to a system component group 4a, 4b, 4c of dangerous system 3. By safety switching elements 10a, 10b, 10c, which are preferably designed as safety relays, system component groups 4a, 4b, 4c connected thereto may be activated and shutdown in a fail-safe way. Fail-safe control unit 9a, 9b, 9c of each safety switching device 2a, 2b, 2c is configured to transmit a binary output signal (A1, A2, A3=0 or A1, A2, A3=1) to each safety switching element 10a, 10b, 10c. The output signals A1=0, A2=0, and A3=0 thereby respectively represent a shutdown signal for shutting down relevant safety switching element 10a, 10b, 10c. In contrast, the output signals A1=1, A2=1, and A3=1 respectively represent an activation signal for activating relevant safety switching element 10a, 10b, 10c. All safety commands of system component groups 4a, 4b, 4c of dangerous system 3 connected thereto are processed in fail-safe control units 9a, 9b, 9c so that safety switching elements 10a, 10b, 10c of safety switching devices 2a, 2b, 2c may be controlled depending on the result of the evaluations.

Based on a dimensioning example, different operating states of safety circuit 1 depicted in FIG. 2 will be subsequently explained in greater detail. It shall thereby be assumed that continuous current source 8 provides an electric monitoring current I=2 mA, and that electric resistor 60 has a resistor value R=500 Ohms.

State No. 1: Normal Operation

In an interference-free (normal) operating state of all system component groups 4a, 4b, 4c of dangerous system 3, all safety switching devices 2a, 2b, 2c are activated. The internal evaluation of the input signals from the sensors of system component groups 4a, 4b, 4c of dangerous system 3 provides a value of E1=E2=E3=1 on the input side for the AND gate of each fail-safe control unit 9a, 9b, 9c. Fail-safe control unit 9a, 9b, 9c is also configured to open or to close current flow adjusters 7a, 7b, 7c of relevant safety switching devices 2a, 2b, 2c. This may be carried out via a binary control signal S1, S2, S3, where S1, S2, S3=1 represents a closed current flow adjusters 7a, 7b, 7c, and S1, S2, S3=0 represents an open current flow adjusters 7a, 7b, 7c.

In the normal operating state of all system component groups 4a, 4b, 4c connected to safety switching devices 2a, 2b, 2c, E1=E2=E3=1 and S1=S2=S3=1 applies. This means that all current flow adjusters 7a, 7b, 7c of safety switching devices 2a, 2b, 2c, and thus also the monitoring circuit are closed so that the electric monitoring current may flow from first safety switching device 2a via second safety switching device 2b to third safety switching device 2c. There is a voltage drop ΔU across electrical resistor 60 of each of measuring devices 6a, 6b, 6c of safety switching devices 2a, 2b, 2c, wherein ΔU=1 V applies. Measuring devices 6a, 6b, 6c transmit an input signal U1=U2=U3=1 to fail-safe control unit 9a, 9b, 9c, which represents that the voltage drop ΔU corresponds to the expected value in the interference-free operation of all system component groups 4a, 4b, 4c.

Furthermore, because E1=E2=E3=1 and U1=U2=U3=1, all safety switching element 10a, 10b, 10c, which are preferably designed as safety relays, are closed (i.e., for the output signals which are generated by fail-safe control unit 9a, 9b, 9c of each safety switching device 2a, 2b, 2c, A1=A2=A3=1 applies), so that all system component groups 4a, 4b, 4c connected thereto may be supplied with their electrical operating voltage.

State No. 2: Reliable Shutdown of System Component Groups

If, for example, in second system component group 4b an emergency off or emergency stop button/switch is actuated, and thus safety switching element 10b of second safety switching device 2b is opened, then this emergency off or emergency stop message is also to be provided to the two remaining safety switching devices 2a, 2c of safety circuit 1, so that system component groups 4a, 4c connected thereto may likewise be simultaneously reliably shut down. The result of the internal signal processing of fail-safe control unit 9b of second safety switching device 2b then results in a value E2=0, which represents the emergency off or emergency stop message. In order to achieve a reliable shutdown of the system component groups 4a, 4c of the two remaining safety switching devices 2a, 2c, fail-safe control unit 9b of second safety switching device 2b controls current flow adjuster 7b of second safety switching device 2b such that this is opened and the electric monitoring current flow from first safety switching device 2a to third safety switching device 2c is interrupted. Current flow adjuster 7b of second safety switching device 2b thereby receives a control signal S2=0, which causes an opening of the relevant current flow adjuster 7b and leads to an interruption of the monitoring circuit of safety circuit 1.

Then, for the current drop ΔU across resistors 60 of measuring device 6a of first safety switching device 2a and measuring device 6c of third safety switching device 2c, ΔU=0 V applies. This voltage drop ΔU=0 V is detected in each case by evaluation units 61 of measuring devices 6a, 6c of first and third safety switching devices 2a, 2c. Evaluation units 61 of measuring devices 6a, 6c of first safety switching device 2a and third safety switching device 2c each generate an input signal U1=0 or U3=0 for the AND gate of fail-safe control units 9a, 9c of first and third safety switching devices 2a, 2c. Since for the input signal of fail-safe control unit 9a of first safety switching devices 2a, U1=0 applies, fail-safe control unit 9a generates an output signal A1=0, which causes a shutdown of safety switching element 10a of first safety switching device 9a. Since, in addition, for the input signal of fail-safe control unit 9c of third safety switching device 2c, U3=0 applies, fail-safe control unit 9c generates an output signal A3=0, which causes a shutdown of safety switching element 10c of first safety switching device 9c.

State No. 3: Reactivation

If, starting from the previously described operating state, safety switching element 10b of second safety switching device 2b is reactivated so that second system component group 4b is placed back into operation, then the internal signal processing of fail-safe control unit 9b of second safety switching device 2b provides the result E2=1. Consequently, a switching signal S2=1 is generated, which closes current flow adjuster 7b of second safety switching device 2b. Since current flow adjuster 7a of first safety switching device 2a and current flow adjuster 7c of third safety switching device 2c were not opened during the switching operation previously carried out, and thus are still located in a closed state, the electric monitoring current may again flow through the closed monitoring circuit of safety circuit 1 from first safety switching device 2a to third safety switching device 2c. Thus, a voltage drop ΔU=1 V may be measured again at resistors 60 of all measuring devices 6a, 6b, 6c, so that fail-safe control unit 9a, 9b, 9c of each safety switching device 2a, 2b, 2c each receives an input signal U1=U2=U3=1 and, because E1=E2=E3=1, each provides corresponding output signals A1=A2=A3=1. The output signals A1=1 and A3=1 lead to safety switching elements 10a, 10c of first and third safety switching devices 2a, 2c being likewise closed, so that system component groups 4a, 4c of dangerous system 3 connected thereto may be likewise supplied again with an operating voltage.

State No. 4: Wiring Fault

If, for example, no electric monitoring current flows through safety switching devices 2a, 2b, 2c due to a wiring fault, no voltage drop ΔU may be measured at resistors 60 of all measuring devices 6a, 6b, 6c. Thus, ΔU=0 V applies. In this fault condition, fail-safe control unit 9a, 9b, 9c of each safety switching device 2a, 2b, 2c receives an input signal U1=U2=U3=0. Fail-safe control unit 9a, 9b, 9c of each safety switching device 2a, 2b, 2c provides corresponding output signals A1=A2=A3=0, which cause an opening of safety switching elements 10a, 10b, 10c and thus a reliable shutdown of system component groups 4a, 4b, 4c connected thereto.

If the measurements of the voltage drop ΔU should result in ΔU>1 V or 0 V<ΔU<1 V, then a fault condition is present. Evaluation units 61 of measuring devices 6a, 6b, 6c thereby likewise generate an input signal U1=U2=U3=0, so that fail-safe control unit 9a, 9b, 9c of each safety switching device 2a, 2b, 2c respectively provides a corresponding output signal A1=A2=A3=0. These output signals A1=A2=A3=0 cause an opening of safety switching elements 10a, 10b, 10c and thus a reliable shutdown of system component groups 4a, 4b, 4c connected thereto.

Figure 3:
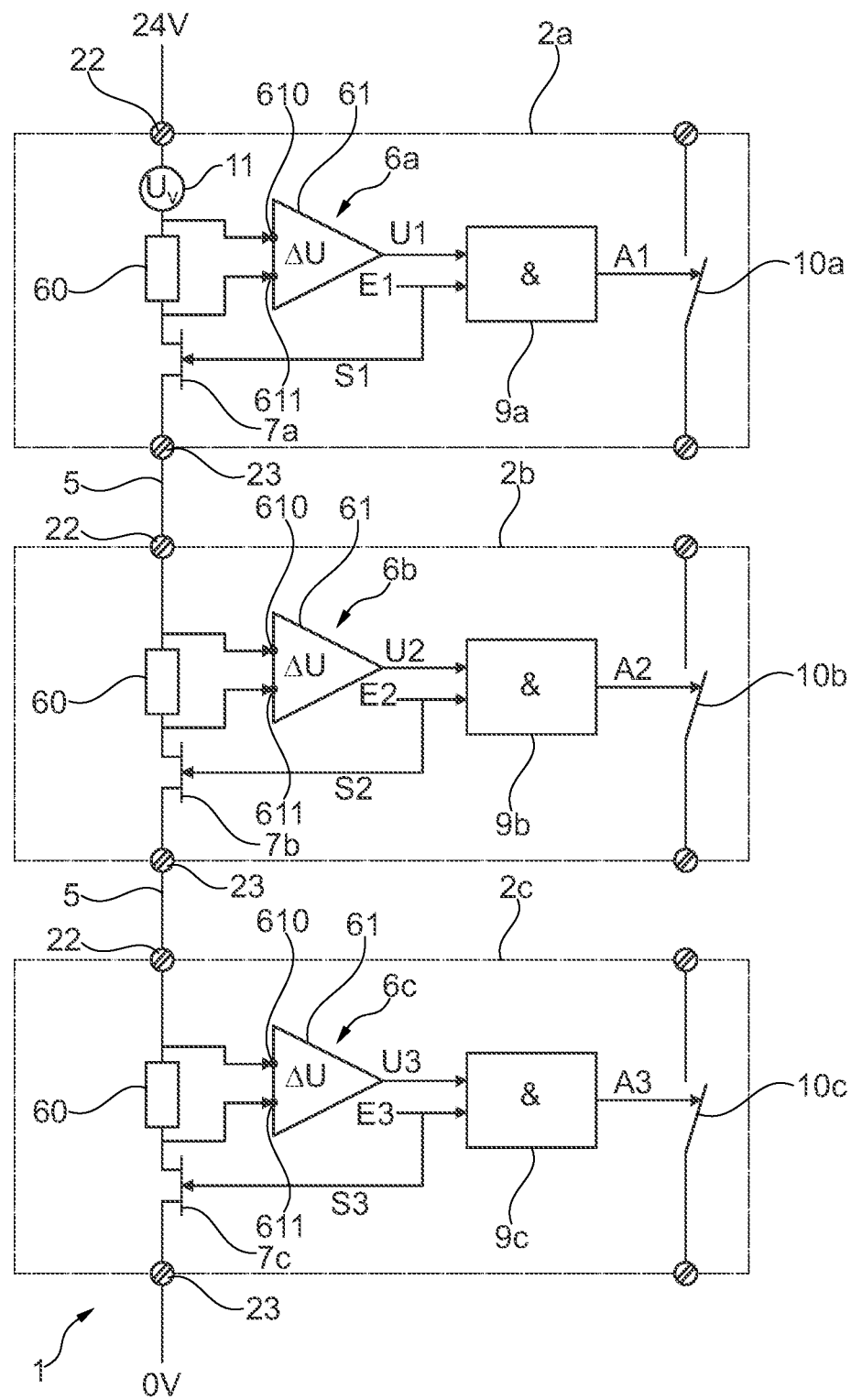

A second embodiment of safety circuit 1 will subsequently be described in greater detail with reference to FIG. 3. Unlike the first embodiment, first safety switching device 2a has a continuous voltage source 11, which continuously maintains the voltage at a predetermined value, regardless of the fluctuating supply voltage which is provided by the external voltage supply device. For example, the voltage may be maintained at a continuous value UV=15 V by the continuous voltage source 11. Resistors 60 again have a value R=500 Ohms in this embodiment.

The following statements apply for the voltage drop ΔU across respective resistor 60, measured by measuring devices 6a, 6b, 6c, and the binary input signals provided by evaluation units 61:

U=1, if ΔU=5 V
U=0, if ΔU=0 V
Fault, if ΔU>5 V or 0 V<ΔU<5 V.

Various operating states of safety circuit 1 are subsequently described again in greater detail. The operating states No. 1 through No. 4 correspond, from a technical standpoint, to those from the first embodiment, so that these are subsequently described in an abbreviated form.

State No. 1: Normal Operation

As in the first embodiment, in normal operation, all safety switching devices 2a, 2b, 2c and system component groups 4a, 4b, 4c connected thereto are activated. A voltage drop ΔU=5 V may be measured across each resistor 60 of measuring devices 6a, 6b, 6c, so that, analogous to the first embodiment, U1=U2=U3=1 applies for the binary input signals U1, U2, U3. As no emergency off or emergency stop has been initiated, E1=E2=E3=1 additionally applies, so that all current flow adjusters 7a, 7b, 7c are closed. Thus, S1=S2=S3=1 applies. Furthermore, for the output signals A1, A2, A3 of fail-safe control unit 9a, 9b, 9c of each safety switching device 2a, 2b, 2c, A1=A2=A3=1 applies. This means that all safety switching elements 10a, 10b, 10c are closed.

State No. 2: Reliable Shutdown of System Component Groups

If, for example, an emergency off button/switch of second system component group 4b is actuated and safety switching element 10b of second safety switching device 2b is opened, then the internal signal processing in fail-safe control unit 9b leads to the result E2=0. This causes a shutdown signal S2=0 to be provided to current flow adjuster 7b of second safety switching device 2b by fail-safe control unit 9b. Current flow adjuster 7b of second safety switching device 2b is opened so that the monitoring current flow within the electric monitoring circuit of safety circuit 1 is interrupted from first safety switching device 2a to third safety switching device 2c.

For the current drop ΔU across resistors 60 of measuring devices 6a, 6c of first safety switching device 2a and third safety switching device 2c, ΔU=0 V applies. Consequently, fail-safe control unit 9a of first safety switching device 2a receives an input signal U1=0, and for its part generates an output signal A1=0, which leads to an opening of safety switching element 10a of first safety switching device 2a. Analogously, fail-safe control unit 9c of third safety switching device 2c receives an input signal U3=0, and generates an output signal A3=0, which leads to an opening of safety switching element 10c of third safety switching device 2c.

State No. 3: Reactivation of the System Component Groups

If, starting from the previously described operating state, safety switching element 10b of second safety switching device 2b is reactivated so that second system component group 4b is placed back into operation, then the internal signal processing of fail-safe control unit 9b of second safety switching device 2b provides the result E2=1. Consequently, fail-safe control unit 9b of second safety switching device 2b generates a switching signal S2=1, which closes current flow adjuster 7b of second safety switching device 2b again. Since current flow adjuster 7a of first safety switching device 2a and current flow adjuster 7c of third safety switching device 2c were not opened during the previous shutdown process, and thus are still located in a closed state, the electric monitoring current may again flow, after closing current flow adjuster 7*b* of second safety switching device 2*b*, from first safety switching device 2*a* to third safety switching device 2*c*. Thus, a voltage drop ΔU=5 V may be measured at resistors 60 of all measuring devices 6*a*, 6*b*, 6*c*, so that fail-safe control unit 9*a*, 9*b*, 9*c* of each safety switching device 2*a*, 2*b*, 2*c* receives an input signal U1=U2=U3=1 and, because E1=E2=E3, each provides corresponding output signals A1=A2=A3=1. The output signals A1=1 and A3=1 lead to safety switching elements 10*a*, 10*c* of first and third safety circuit 2*a*, 2*c* being likewise closed, so that system component groups 4*a*, 4*c* of dangerous system 3 connected thereto may be supplied again with their operating voltage.

State No. 4: Wiring Fault

If, for example, no electric monitoring current flows through safety switching devices 2*a*, 2*b*, 2*c* due to a wiring fault, no voltage drop ΔU may be measured at resistors 60 of all measuring devices 6*a*, 6*b*, 6*c*. Thus, ΔU=0 V applies. In this fault condition, fail-safe control unit 9*a*, 9*b*, 9*c* of each safety switching device 2*a*, 2*b*, 2*c* receives an input signal U1=U2=U3=0. Fail-safe control unit 9*a*, 9*b*, 9*c* of each safety switching device 2*a*, 2*b*, 2*c* provides corresponding output signals A1=A2=A3=0, which cause an opening of safety switching elements 10*a*, 10*b*, 10*c* and thus a reliable shutdown of system component groups 4*a*, 4*b*, 4*c* connected thereto.

State No. 5: Fault Condition: 0 V Voltage at Output Terminal 23 of Second Safety Switching Device 2*b* and/or at Input Terminal 22 of Third Safety Switching Device 2*c*

If a voltage U=0 is present at output terminal 23 of second safety switching device 2*b* and/or at input terminal 22 of third safety switching device 2*c*, then a voltage drop ΔU=7.5 V is detected by measuring devices 6 in first safety switching device 2*a* and in second safety switching device 2*b* respectively. Evaluation units 61 of first and second safety switching devices 2*a*, 2*b* generate an input signal U1=0 and U2=0, which is provided to fail-safe control unit 9*a*, 9*b* of first and second safety switching devices 2*a*, 2*b* so that output signals A1=0 and A2=0 may be generated, which cause an opening of safety switching elements 10*a*, 10*b* of first and second safety switching devices 2*a*, 2*b*. In addition, a fault message is transmitted.

In third safety switching device 2*c*, a value of ΔU=0 V results for the voltage drop across resistor 60. This leads to an input signal U3=0 for fail-safe control unit 9*c* of third safety switching device 2*c*, which generates an output signal A3=0, which causes an opening of safety switching element 10*c* of third safety switching device 2*c*.

State No. 6: Fault Condition: 24 V Voltage at Output Terminal 23 of Second Safety Switching Device 2*b* and/or at Input Terminal 22 of Third Safety Switching Device 2*c*

If a voltage U=24 V is applied at output terminal 23 of second safety switching device 2*b* and/or at input terminal 22 of third safety switching device 2*c*, then a voltage drop ΔU=−4.5 V is detected by measuring devices 6 in first safety switching device 2*a* and in second safety switching device 2*b* respectively. Evaluation units 61 of measuring devices 6*a*, 6*b* of first and second safety switching devices 2*a*, 2*b* generate an input signal U1=0 and U2=0, which is provided to fail-safe control unit 9*a*, 9*b* of first and second safety switching devices 2*a*, 2*b* so that output signals A1=0 and A2=0 are generated, which cause an opening of safety switching elements 10*a*, 10*b* of first and second safety switching devices 2*a*, 2*b*. In addition, a fault message is transmitted. Within third safety switching device 2*c*, a value of ΔU=24 V results for the voltage drop across resistor 60. This leads to an input signal U3=0 for fail-safe control unit 9*c* of third safety switching device 2*c*, which generates an output signal A3=0, which causes an opening of safety switching element 10*c* of third safety switching device 2*c*. In addition, a fault message is transmitted.

Figure 4:
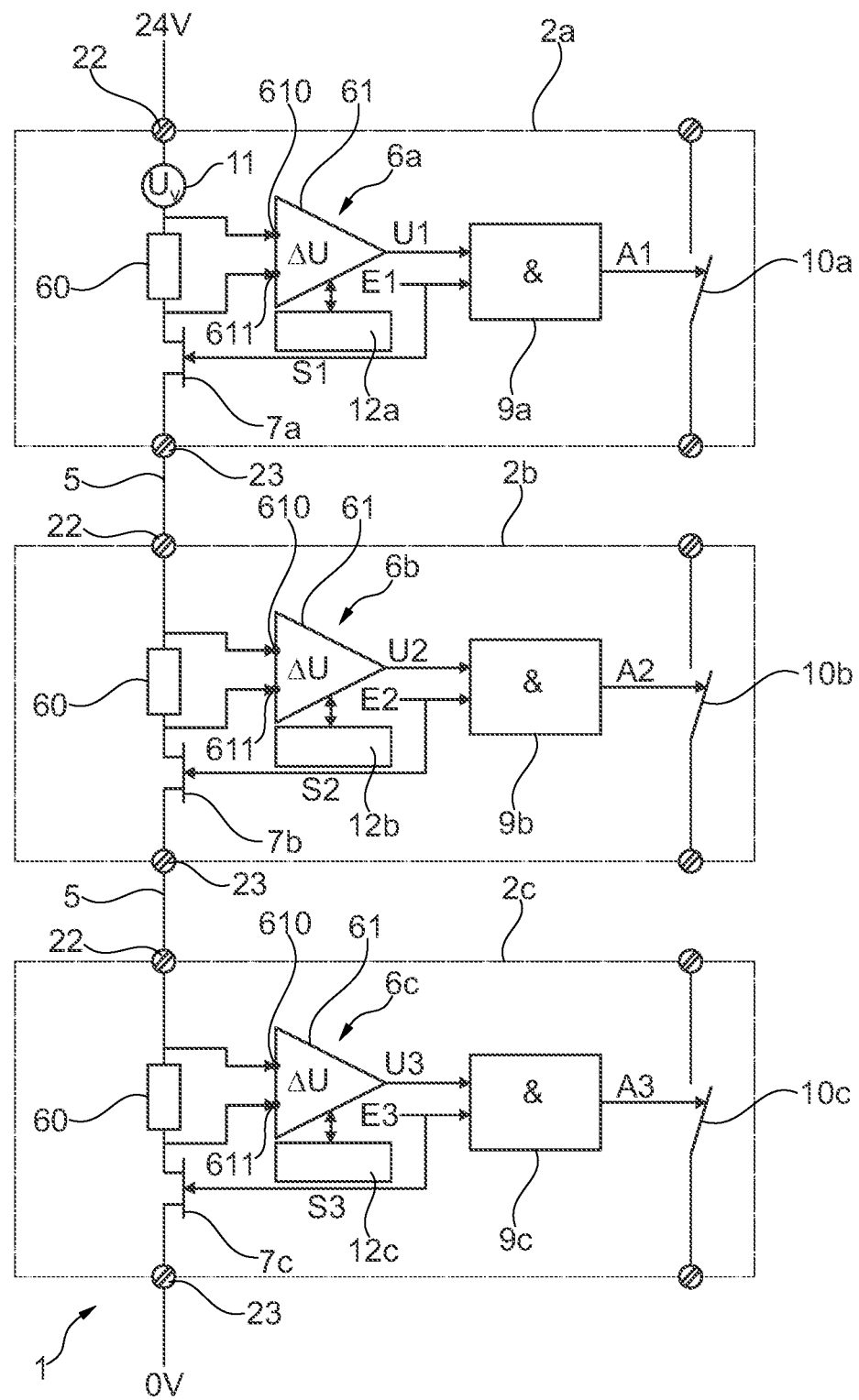

A third embodiment of safety circuit 1 will subsequently be described in greater detail with reference to FIG. 4. This embodiment differs from the second embodiment in that each of safety switching devices 2*a*, 2*b*, 2*c* additionally has memories 12*a*, 12*b*, 12*c* which are connected to evaluation unit 61 of measuring device 6*a*, 6*b*, 6*c* of relevant safety switching device 2*a*, 2*b*, 2*c*. Two reference voltage values $U_{ref,1}$ and $U_{ref,2}$ may be retrievably stored within memories 12*a*, 12*b*, 12*c* for each safety switching device 2*a*, 2*b*, 2*c*. A first reference voltage value $U_{ref,1}$ specifies the magnitude of the voltage upstream of resistor 60 of measuring device 6*a*, 6*b*, 6*c* of each safety switching device 2*a*, 2*b*, 2*c*. A second reference voltage value $U_{ref,2}$ specifies the magnitude of the voltage downstream of resistor 60 of measuring device 6*a*, 6*b*, 6*c* of relevant safety switching device 2*a*, 2*b*, 2*c*. The two reference voltage values $U_{ref,1}$ and $U_{ref,2}$ of all safety switching devices 2*a*, 2*b*, 2*c* may be initialized ("learned") during commissioning of safety circuit 1 and respectively retrievably stored in memories 12*a*, 12*b*, 12*c* of safety switching devices 2*a*, 2*b*, 2*c*.

The operating states No. 1 through no. 4 correspond to those of the second embodiment, so that these will not be addressed again here.

State No. 5: Fault Condition: 0 V voltage or 24 V voltage at output terminal 23 of second safety switching device 2*b* and/or at input terminal 22 of third safety switching device 2*c*

If, for example, a voltage U=0 V is present at output terminal 23 of second safety switching device 2*b* and/or at input terminal 22 of third safety switching device 2*c* (operating state no. 5 of the third embodiment), or a voltage U=24 V is applied (operating state no. 6 of the third embodiment), then deviations of the actual voltages from reference voltage values $U_{ref,1}$ and $U_{ref,2}$, retrievably stored in memories 12*a*, 12*b*, 12*c*, occur in all safety switching devices 2*a*, 2*b*, 2*c* upstream and/or downstream of resistor 60 of each measuring device 6*a*, 6*b*, 6*c*. These deviations cause evaluation units 61 of measuring devices 6*a*, 6*b*, 6*c* to generate corresponding input signals U1=U2=U3=0, which are provided to fail-safe control unit 9*a*, 9*b*, 9*c* of relevant safety switching device 2*a*, 2*b*, 2*c*. Fail-safe control unit 9*a*, 9*b*, 9*c* of each safety switching device 2*a*, 2*b*, 2*c* generates an output signal A1=A2=A3=0. These output signals A1, A2, A3 cause safety switching elements 10*a*, 10*b*, 10*c* of safety switching devices 2*a*, 2*b*, 2*c* to be opened.

Figure 5:
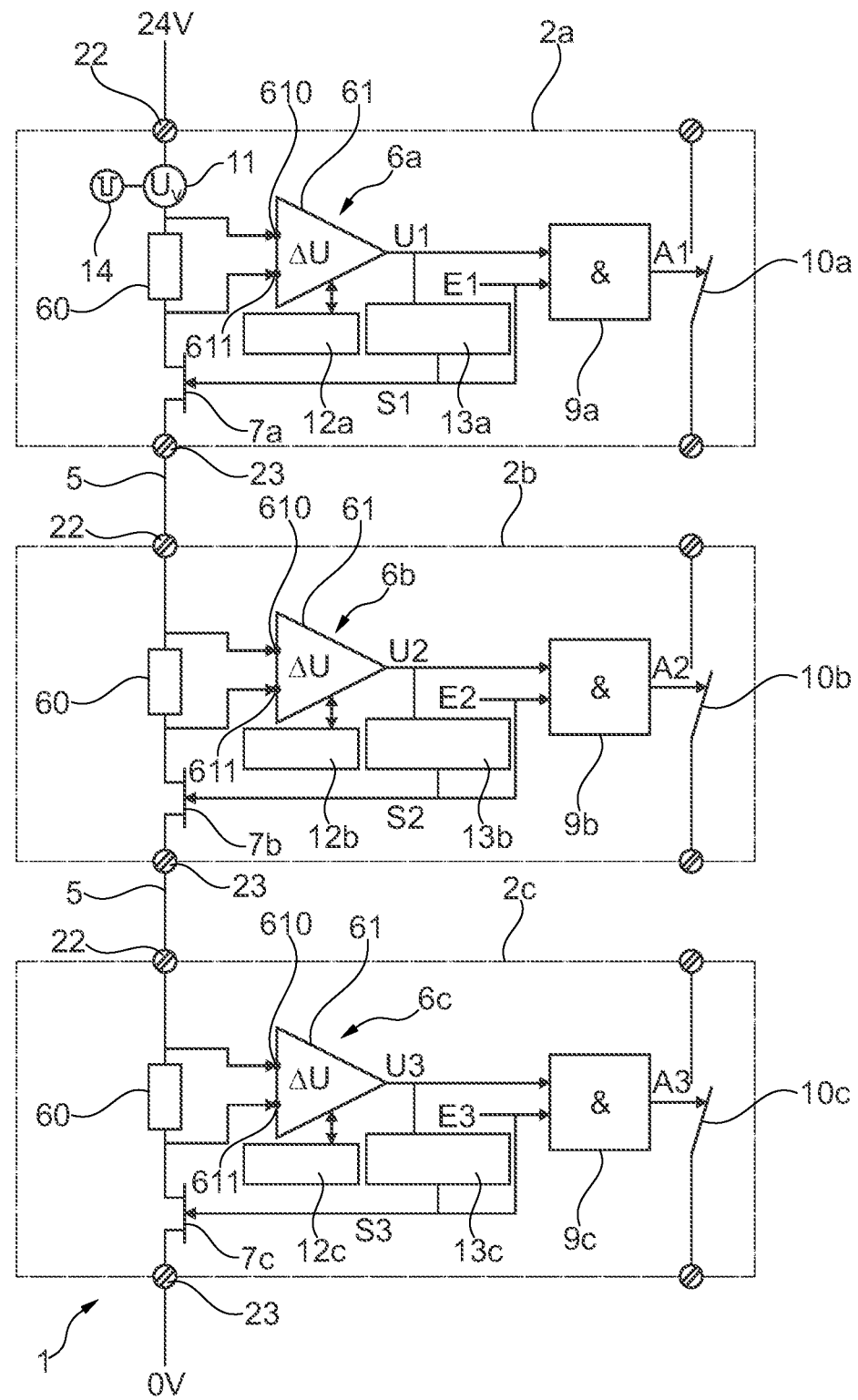

A fourth embodiment of safety circuit 1 will subsequently be described in greater detail with reference to FIG. 5. This embodiment differs from the third embodiment in that the first safety switching device 2*a* additionally has a voltage pulse generator 14. Furthermore, each of safety switching devices 2*a*, 2*b*, 2*c* comprises a voltage pulse evaluator 13*a*, 13*b*, 13*c*, which are configured to detect and evaluate voltage pulses generated by voltage pulse generator 14, which may be, in particular, 0 V voltage pulses.

Each of safety switching devices 2*a*, 2*b*, 2*c* again comprises memories 12*a*, 12*b*, 12*c* which are connected to evaluation unit 61 of measuring device 6*a*, 6*b*, 6*c* of relevant safety switching device 2*a*, 2*b*, 2*c*. Two reference voltage values, $U_{ref,1}$ and $U_{ref,2}$ may be retrievably stored for each safety switching device 2*a*, 2*b*, 2*c* within memories 12*a*, 12*b*, 12*c*. A first reference voltage value $U_{ref,1}$ specifies the magnitude of the voltage upstream of resistor 60 of measuring device 6*a*, 6*b*, 6*c* of relevant safety switching device $2a$, $2b$, $2c$. A second reference voltage value $U_{ref,2}$ specifies the magnitude of the voltage downstream of resistor 60 of measuring device 6a, 6b, 6c of each safety switching device $2a$, $2b$, $2c$. Reference voltage values $U_{ref,1}$ and $U_{ref,2}$ of all safety switching devices $2a$, $2b$, $2c$ may be initialized ("learned") during commissioning of safety circuit 1 and retrievably stored in memories 12a, 12b, 12c of safety switching devices $2a$, $2b$, $2c$.

If the voltage values, measured upstream or downstream of resistor 60 of measuring device 6a, 6b, 6c of safety switching devices $2a$, $2b$, $2c$ deviate from the "learned" and stored reference voltage values $U_{ref,1}$ and $U_{ref,2}$, then a fault message is generated. These deviations cause evaluation units 61 to generate corresponding input signals $U1=U2=U3=0$, which are provided to fail-safe control unit 9a, 9b, 9c of relevant safety switching device $2a$, $2b$, $2c$. Fail-safe control unit 9a, 9b, 9c of each safety switching device $2a$, $2b$, $2c$ generates an output signal $A1=A2=A3=0$. These output signals A1, A2, A3 cause safety switching elements 10a, 10b, 10c of safety switching devices $2a$, $2b$, $2c$ to be opened. This corresponds to operating state no. 5 of the third embodiment.

The operating states no. 1 through no. 4 likewise correspond to those of the third embodiment, so that these will not be addressed again here.

State No. 6: Fault Condition: 5 V Voltage at Output Terminal 23 of Second Safety Switching Device 2b and/or at Input Terminal 22 of Third Safety Switching Device 2c

If a voltage $U=5$ is applied at output terminal 23 of second safety switching device 2b and/or at input terminal 22 of third safety switching device 2c, then no voltage pulses, which may, in particular, be 0 V voltage pulses, are detected by voltage pulse evaluator 13c of third safety switching device 2c. Evaluation unit 61 of third safety switching device 2c generates a corresponding input signal $U3=0$ for fail-safe control unit 9c of third safety switching device 2c, which in turn generates an output signal $A3=0$, which causes an opening of safety switching element 10c of third safety switching device 2c. Furthermore, a switching signal $S3=0$ is generated, which opens current flow adjuster 7c of third safety switching device 2c. By this mechanism, the electric monitoring circuit is opened so that $\Delta U=0$ V applies for the voltage drop across resistors 60 of measuring device 6a, 6b of first and second safety switching devices $2a$, $2b$. Evaluation units 61 of measuring devices 6a, 6b of first and second safety switching devices $2a$, $2b$ generate an input signal $U1=U2=0$, which is provided to fail-safe control unit 9a, 9b of relevant safety switching device $2a$, $2b$. Fail-safe control unit 9a of first safety switching device $2a$ generates an output signal $A1=0$, which causes an opening of safety switching element 10a of first safety switching device $2a$ and thus a shutdown of system component group 4a connected thereto. Analogously, fail-safe control unit 9b of second safety switching device $2b$ generates an output signal $A2=0$, which causes an opening of safety switching element 10b of second safety switching device 2b and thus a shutdown of system component group 4b connected thereto. These measures again facilitate a fail-safe shutdown of system component groups 4a, 4b, 4c of the dangerous system in a fault condition.

What is claimed is:

1. A safety circuit for fail-safe shutdown of a dangerous technical system with a plurality of disconnectable system component groups, comprising:
   a plurality of safety switching devices electrically connected to one another in series to form a communication connection and a closed-loop monitoring circuit in which electric monitoring current flows through the safety switching devices, each of the safety switching devices including:
   a fail-safe control unit to which at least one of the system component groups is assigned, the fail-safe control unit being configured to detect and evaluate information about a current operating state of the at least one of the system component groups; and
   a current flow adjuster configured to change the current flow within the monitoring circuit to interrupt the monitoring circuit in response to detection of a safety command by the safety switching device,
   wherein the fail-safe control unit of each of the safety switching devices is configured to generate a shutdown signal in response to an interruption of the current flow within the monitoring circuit, the shutdown signal causing the fail-safe shutdown of any one of the system component groups not already shut down,
   wherein each of the safety switching devices further comprises:
   a measuring device connected to the fail-safe control unit and configured to monitor the electric monitoring current within the monitoring circuit and to provide a first input signal to the fail-safe control unit for the monitoring circuit and measurement of the monitoring current, and to provide a second input signal upon the interruption of the monitoring circuit, and
   a safety switching element coupled to an output of the fail-safe control unit and to an assigned system component group, the safety switching element being configured to shut down the assigned system component group upon receipt of the shutdown signal from the fail-safe control unit, and
   wherein the fail-safe control unit is configured to generate an input signal that causes a closing of the safety switching element in response to the first input signal and to generate the shutdown signal that causes an opening of the safety switching element in response to the second input signal.

2. The safety circuit of claim 1, wherein the current flow adjuster comprises a switching device configured to selectively close or interrupt the monitoring circuit.

3. The safety circuit of claim 1, wherein the current flow adjuster comprises a field effect transistor or a relay.

4. The safety circuit of claim 1, wherein a first of the safety switching devices further comprises a continuous current source configured to generate a continuous current.

5. The safety circuit of claim 1, wherein a first of the safety switching devices further comprises a continuous voltage source configured to generate a continuous voltage.

6. The safety circuit of claim 1, wherein respective current flow adjusters of the plurality of safety switching devices are connected in series.

7. The safety circuit of claim 5, wherein:
   the first of the safety switching devices further comprises a voltage pulse generator connected to the continuous voltage source, the voltage pulse generator being configured to generate defined voltage pulses; and
   each of the safety switching devices further comprises a voltage pulse evaluator configured to detect and evaluate the voltage pulses.

8. A safety circuit for fail-safe shutdown of a dangerous technical system with a plurality of disconnectable system component groups, comprising:
   a plurality of safety switching devices electrically connected to one another in series to form a communication connection and a closed-loop monitoring circuit in which electric monitoring current flows through the safety switching devices, each of the safety switching devices including:
  a fail-safe control unit to which at least one of the system component groups is assigned, the fail-safe control unit being configured to detect and evaluate information about a current operating state of the at least one of the system component groups; and
  a current flow adjuster configured to change the current flow within the monitoring circuit to interrupt the monitoring circuit in response to detection of a safety command by the safety switching device,
wherein the fail-safe control unit of each of the safety switching devices is configured to generate a shutdown signal in response to an interruption of the current flow within the monitoring circuit, the shutdown signal causing the fail-safe shutdown of any one of the system component groups not already shut down,
wherein each of the safety switching devices further comprises:
  a measuring device connected to the fail-safe control unit and configured to monitor the electric monitoring current within the monitoring circuit and to provide a first input signal to the fail-safe control unit for the monitoring circuit and measurement of the monitoring current, and to provide a second input signal upon the interruption of the monitoring circuit, and
wherein the measuring device comprises at least one resistor and an evaluation unit connected to the at least one resistor, the evaluation unit being configured to determine an electrical voltage drop across the at least one resistor and to generate the first or second input signal based on a magnitude of the voltage drop.

9. The safety circuit of claim 8, wherein each safety switching device further comprises:
  a memory connected to the evaluation unit of the measuring device, the memory being configured to retrievably store a first reference voltage value of a reference voltage upstream of the resistor and a second reference voltage value of a second reference voltage downstream of the resistor.

* * * * *